United States Patent [19]

King et al.

[11] 3,813,531

[45] May 28, 1974

[54] DIAGNOSTIC CHECKING APPARATUS

[75] Inventors: Richard L. King, Hillsboro, N.H.; Wayne R. Buzby, Marlboro, Mass.

[73] Assignee: Honeywell Information Systems Inc., Waltham, Mass.

[22] Filed: Jan. 2, 1973

[21] Appl. No.: 320,384

[52] U.S. Cl. .......... 235/153 AK

[51] Int. Cl. .......... G06f 11/04

[58] Field of Search .......... 235/153 AK, 153 R; 340/172.5; 444/1

[56] References Cited

UNITED STATES PATENTS

| | | | |
|---|---|---|---|
| 3,286,239 | 11/1966 | Thompson et al. | 235/153 AK |
| 3,518,413 | 6/1970 | Holtey | 235/153 AK |
| 3,688,263 | 7/1972 | Balogh, Jr. et al. | 340/172.5 |

OTHER PUBLICATIONS

Koederitz, Program Loop Switch for Testing Purposes, IBM Tech. Disclosure Bulletin, Vol. 9, No. 2, July 1966 pp. 156–157.

Flanagan, Program Monitoring Technique, IBM Technical Disclosure Bulletin, Vol. 13, No. 8, January 1971, pp. 2399–2401.

*Primary Examiner*—Charles E. Atkinson
*Attorney, Agent, or Firm*—Faith F. Driscoll; Ronald T. Reiling

[57] ABSTRACT

A data processing system incorporates diagnostic apparatus which enables service personnel to specify the type of instruction which will cause the system to halt when it starts processing that instruction. The diagnostic apparatus includes a plurality of switches which are used to set up the bit pattern of an instruction op-code specifying the type of instruction to be tested. This bit pattern is applied to a comparison circuit included within the diagnostic apparatus which compares the bit pattern with the bit pattern of each instruction op-code at a predetermined period of time as the system operates at normal processing speed. When the apparatus senses the op-code designated, it causes the system to treat the op-code as being illegal and brings the system to an orderly halt and signals a program error condition. The service personnel can then use other apparatus normally included as part of the diagnostic apparatus to clear the error condition and then step through the instruction a cycle at a time examining the operation of the system in executing the instruction.

21 Claims, 7 Drawing Figures

DIAGNOSTIC CHECKING APPARATUS

BACKGROUND OF THE INVENTION

1. Field of Use

The present invention relates to checking circuits and more particularly to circuits which can be employed in a conventional data processing system to facilitate the diagnosing of hardware and software malfunctions.

2. Prior Art

It is well known that data processing systems provide checking apparatus for conditioning the system to be manually stepped through its operation either on an instruction by instruction basis or on a cycle by cycle basis. Additionally, the same systems provide for halting system operation on a particular instruction which bears address designated by selector switches on a control panel. An example of such an arrangement is disclosed in U.S. Pat. No. 3,077,984.

While the arrangements described above assist maintenance personnel in diagnosing system malfunctions, these arrangements have several disadvantages when used to diagnose intermittent fault conditions, quickly and efficiently. For example, the first type of prior art arrangement mentioned can only locate instructions on a step by step basis at manual speeds. Hence, considerable time is required in stepping the system to a particular point within a program on either an instruction by instruction basis or on a cycle by cycle basis.

The second type of arrangement mentioned above required an operator to know in advance the operand address which the instruction bears. Normally, field service representatives do not have information as to the coding of the program being run when the malfunction occurred in the system. Further, there can be many different types of instructions having the same operand address making it different to locate the point in a program where the malfunction occurred for testing purposes. Hence, this arrangement is not convenient for quick diagnosis of failures.

Accordingly, it is an object of the present invention to provide diagnostic apparatus for use in a data processing system to facilitate diagnosing both hardware and program malfunctions.

It is a further object of the present invention to provide apparatus which enables maintenance personnel to specify an instruction type for testing which is locatable by the system automatically at normal processing rates.

It is still a further more specific object of the present invention to provide diagnostic apparatus which can be incorporated into a system with the addition of a minimum amount of logic circuits.

SUMMARY OF THE INVENTION

The above objects are achieved in a preferred embodiment of the present invention which includes diagnostic apparatus which couples to the command or op-code register circuits of the system. The diagnostic apparatus includes a plurality of switches used to establish a bit pattern of the op-code of an instruction type to be tested. A comparison circuit included within the diagnostic apparatus enables the system to come to an orderly halt when the bit pattern established by the switches corresponds to the op-code of the instruction being executed by the system stored in the op-code register. In the preferred embodiment, the system is brought to an orderly halt by having the op-code of the instruction treated as illegal for testing purposes which causes the system to halt at a predetermined point within the instruction and signal the halt as a program error.

When the system has been brought to an orderly halt, maintenance personnel can then clear the system of the error condition in a conventional manner and then test system operation while it processes the instruction whose op-code was previously detected as being illegal. After completing the test, the field service representative can then either specify an op-code of another instruction to be tested next or can condition the system to stop at another point within the program which specifies the same instruction type.

The diagnostic apparatus in accordance with the present invention minimizes the amount of logic circuits which are required for the test. Specifically, the diagnostic apparatus comprises for the most part existing circuits normally used to perform other operations within the system. These circuits include the mode control circuits used in Single Cycle Mode of operation, a Count Cycle Mode of operation, and a Count Instruction Mode of operation. In the Single Cycle Mode of operation, the system is stepped through its normal operation a cycle at a time. During a Count Cycle Mode of operation, the system steps through the number of cycles specified by the set of switches used by the invention and for an Instruction Count Mode of operation, the system is operative to step through the number of instructions specified by the same switches. Additionally, the invention makes use of existing system illegal op-code detecting circuits.

The above and other objects of the present invention are achieved in the illustrated embodiment described hereinafter. The novel features which are believed to be characteristic of the invention, both as to its organization and method of operation, together with further objects and advantages will be better understood from the following description when considered in connection with the accompanying drawings. It is to be expressly understood, however, that each of the drawings is for the purpose of illustration and description only and is not intended as a definition of the limits of the invention.

DESCRIPTION OF THE PREFERRED EMBODIMENT

Figure 1:
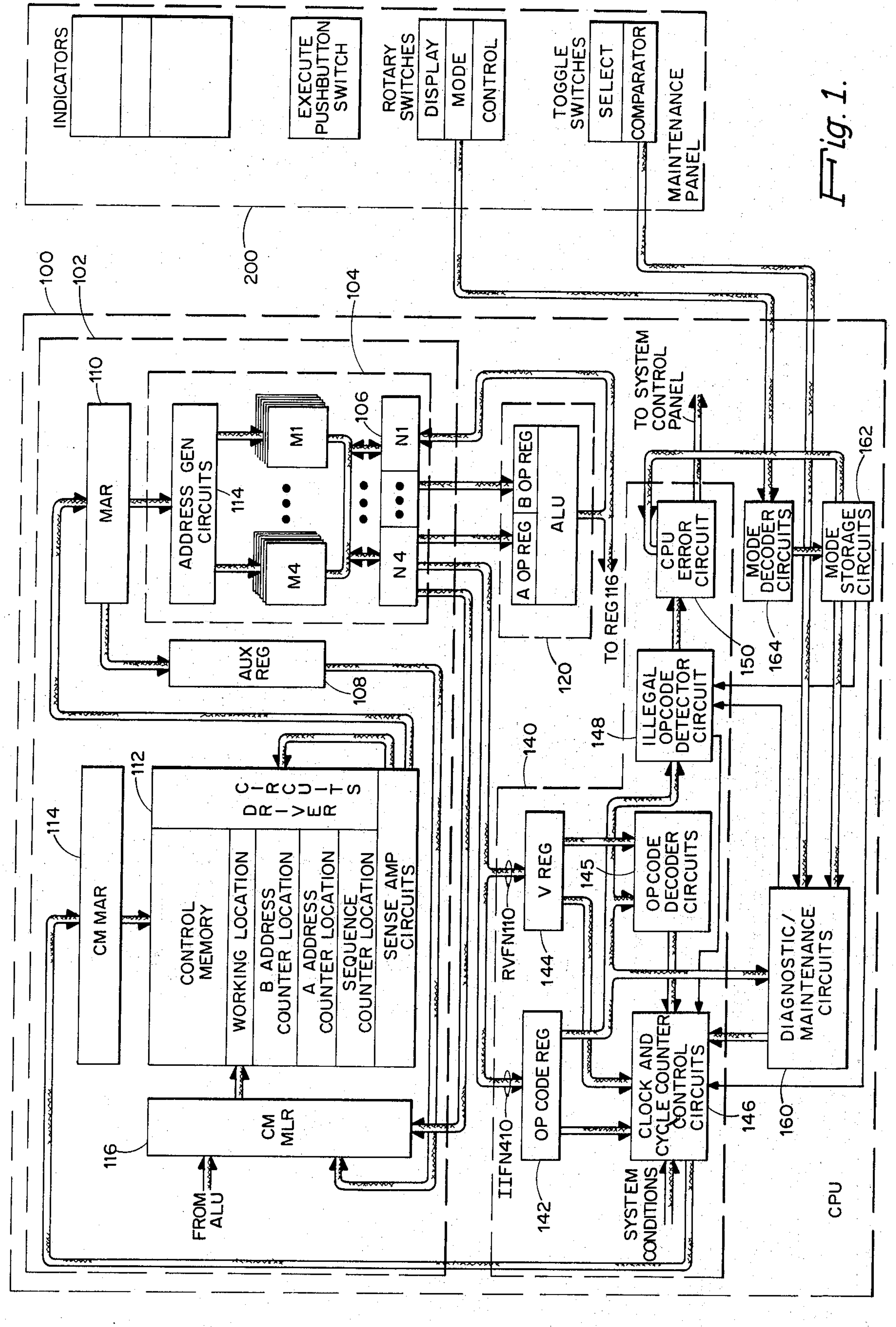
FIG. 1 is a block diagram of a data processing system employing the present invention.

Referring first to FIG. 1, there is disclosed a data processing system 100 which includes the diagnostic apparatus of the present invention As seen from the figure, the system includes a memory section 102, an arithmetic and logic section 120, a control section 140 and a diagnostic and maintenance circuit control section 160. The section 160 couples to the circuits of the maintenance panel 200 which operate to display signals and control the mode of operation of the section.

The memory section 102 includes a main memory 104, having a plurality of memory modules arranged to form four interfaces, permitting four characters to be accessed from a control memory 112 via a memory address register 110 and address generation circuit 114. A four character wide memory input/output register 106 couples to main memory 104 so as to receive and store the four consecutive characters read from main memory 104 referenced by memory address register 110.

Control memory 112 also conventional in design, couples to main memory address register 110 via an auxiliary register 108 and a control memory local register 116. Additionally, the control register 116 couples to main memory 104 via an input/output register 106 and to section 120.

The control memory 112 comprises a plurality of memory storge locations, each of which is adapted to store information necessary to the processing of program instructions. Thus, these storage locations contain signals specifying the addresses of program instructions and information pertinent to the processing of these instructions. For example, the control memory of FIG. 1 includes A and B operand address storage locations, sequence and cosequence counter storage locations which store digital representations of main memory addresses used in referencing a next instruction to be processed within a program as well as present and starting storage locations associated with storing addresses for processing input and output data transfer operations. The auxiliary register 108 includes increment/decrement logic circuits for modifying the addresses transferred between the control memory 112 and memory address register 110.

It is also seen that the main memory output register 106 couples to the A and B operand registers of an arithmetic and logis unit (ALU) included within the section 120. This unit is arranged to perform both arithmetic and logical operations upon the operands of an instruction and deliver a four character result to main memory 104 via memory register 106. The unit is conventional in design and may take the form of the arithmetic logic units designated as SN74181 described at pages 9-315 through 9-320 of a manual titled "TTL Integrated Circuits Catalog," published by Texas Instruments Incorporated and dated 1971.

The control section 140 as shown includes a pair of registers 142 and 144 which store an operation code (op-code) portion and an operation code modifier portion of an instruction being processed. The portions of the instruction stored in registers 142 and 144 are herein referred to as the op-code and variant characters, respectively.

The control section 140 is operative to generate signals for controlling the transfers of information throughout the system and further includes decoder circuits 145 and clock and cycle counter control circuits 146. The control circuits 146 include master clock, not shown, which establishes the basic timing for the system. Additionally, the control circuits 146 include a plurality of storage devices and logic circuits which provide signals defining the various phases of instruction processing and execution which include a number of major and minor cycles. As shown in FIG. 1, the decoder circuits 144 couple to illegal op-code detector circuits 148 which in turn couple to error circuits 150. The output of the error circuits are applied to the system control panel, not shown. These circuits provide signals to the appropriate indicators located on the control panel.

The diagnostic maintenance and control circuits 160 couple to mode storage circuits included within the block 162. In accordance with the settings of rotary switches located on the maintenance panel, the mode control circuits apply the appropriate control signals to the diagnostic circuits 160 which places the system in a number of testing modes. Similarly, decoder circuits included within a block 164 apply control signals to the mode storage circuits and diagnostic and control circuits of blocks 160 and 162, respectively, conditioning these circuits to permit the central processing unit 100 to be stepped through its normal operation by specified amounts as explained herein.

1. Maintenance Panel 200

Figure 1A:
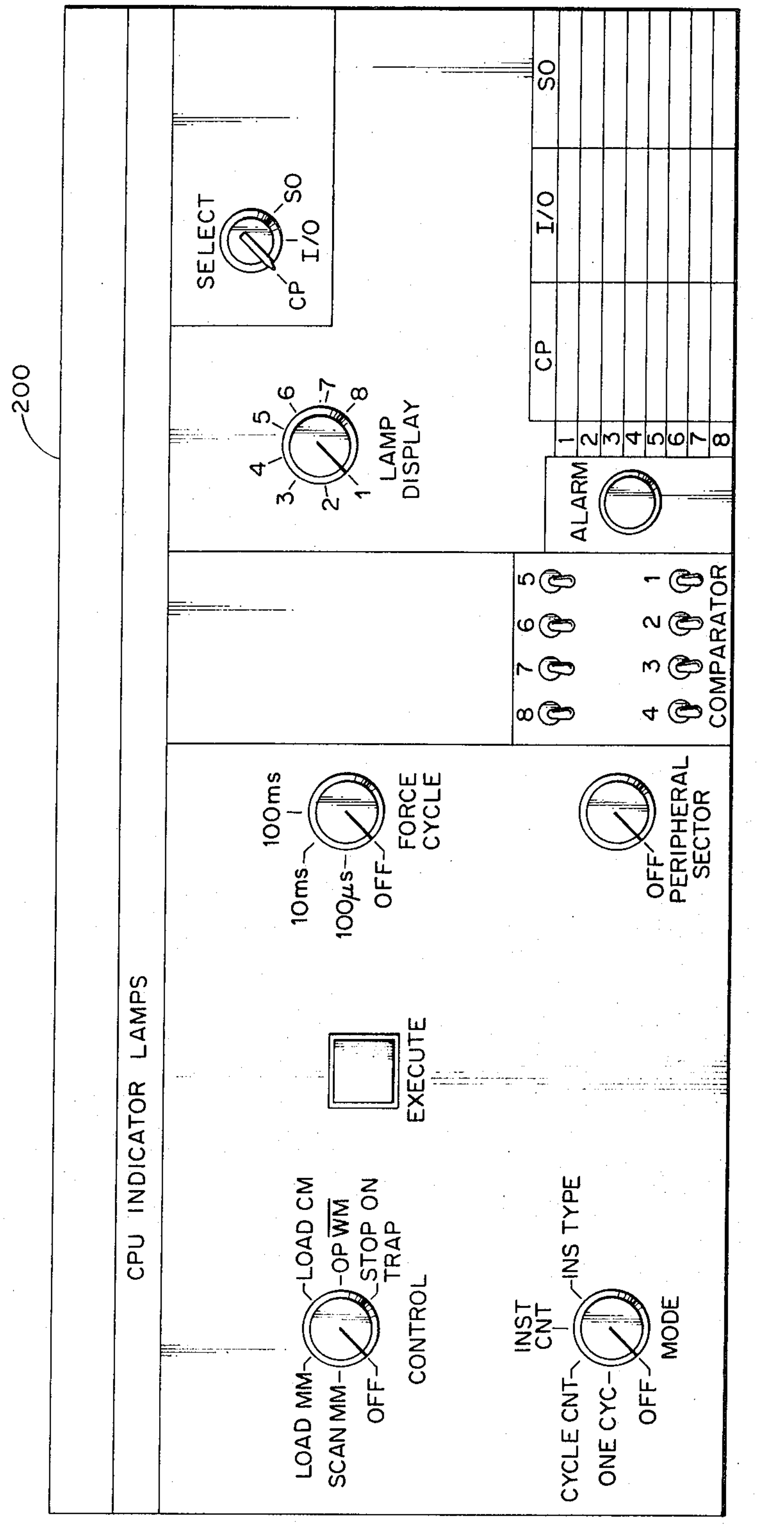
FIG. 1*a* illustrates in greater detail the maintenance panel arrangement of FIG. 1.

FIG. 1*a* shows some of the various switches and indicators which comprise the maintenance panel 200. As seen from the figure, the panel includes an Execute pushbutton which is used to initiate diagnostic tests in conjunction with the positions selected on a Mode switch, a Control switch and a Force Cycle switch. The Control switch positions include an OFF position, a scan main memory position (SCAN MM), a load main memory position (LOAD MM), a load control memory position (LOAD CM), an op-code not word mark position (OPWM) and a stop on trap position. The first three switch positions are self explanatory and provide the capability of having main memory and control memory locations scanned or loaded with new information from and under the control of switches on the maintenance panel 200. The OPWM switch position conditions the CPU to cause any "non-word marked" storage location read during the time the op-code of an instruction is fetched from main memory 104 to result in a program error. In other words, the transfer of an op-code without "a word mark" into the op-code register is detected as an error. The stop on trap switch position permits maintenance personnel to write in conditions upon which the system halts.

The various positions of the Mode switch of the maintenance panel is used in conjunction with the comparator switches together with the Execute pushbutton in a manner to define the amount of CPU processing time to a specified number of CPU cycles or a specified number of instructions. Specifically, when the Mode switch is placed in the One Cycle Mode of operation, each depression and release of the Execute pushbutton causes the CPU to step through one CPU cycle of operation. When the Mode switch is placed in the Cycle Count Mode position, each depression and release of the Execute pushbutton causes the CPU to step through the number of cycles specified in octal by the comparator switches. Similarly, when the Mode switch is placed to the Instuction Count Mode position, each depression and release of the Execute pushbutton causes the CPU to step through the number of instructions in octal specified by the setting of the comparator switches.

The last position of the Mode switch designates as Instruction Type Mode and is the most pertinent to the present invention. In general, each depression and release of the Execute pushbutton causes the CPU to process instructions of a program until it encounters an op-code coded to that specified by the setting of the comparator switches. This operation causes the CPU to stop at a predetermined time within the CPU's cycle of operation during which the instruction was fetched. Further, for the purposes of the test, it conditions the CPU to treat the op-code specified by the setting of the comparator switches as an illegal op-code. This allows the system to be brought to an orderly halt and have the contents of the sequence counter storage location set to the point or to contain an address which designates the storage location which references the start of the instruction including the illegal op-code. After the CPU has been brought to an orderly stop, the error circuits signal the system location of the instruction type as a program error.

The Force Cycle switch enables the CPU to be operated for specified time intervals selected by various positions of the switch. The Peripheral Selector switch on the maintenance panel 200 which is not pertinent to the present invention permits certain diagnostic operations to be performed in connection with input/output operations. The remaining switches include a Select switch which determines which unit is to be tested from the maintenance panel (e.g., CPU, I/O or SO) and a Lamp Display Switch which is a multi-positioned rotary switch used to select specific registers or functions in the unit designated by the Select switch.

Figure 1B:
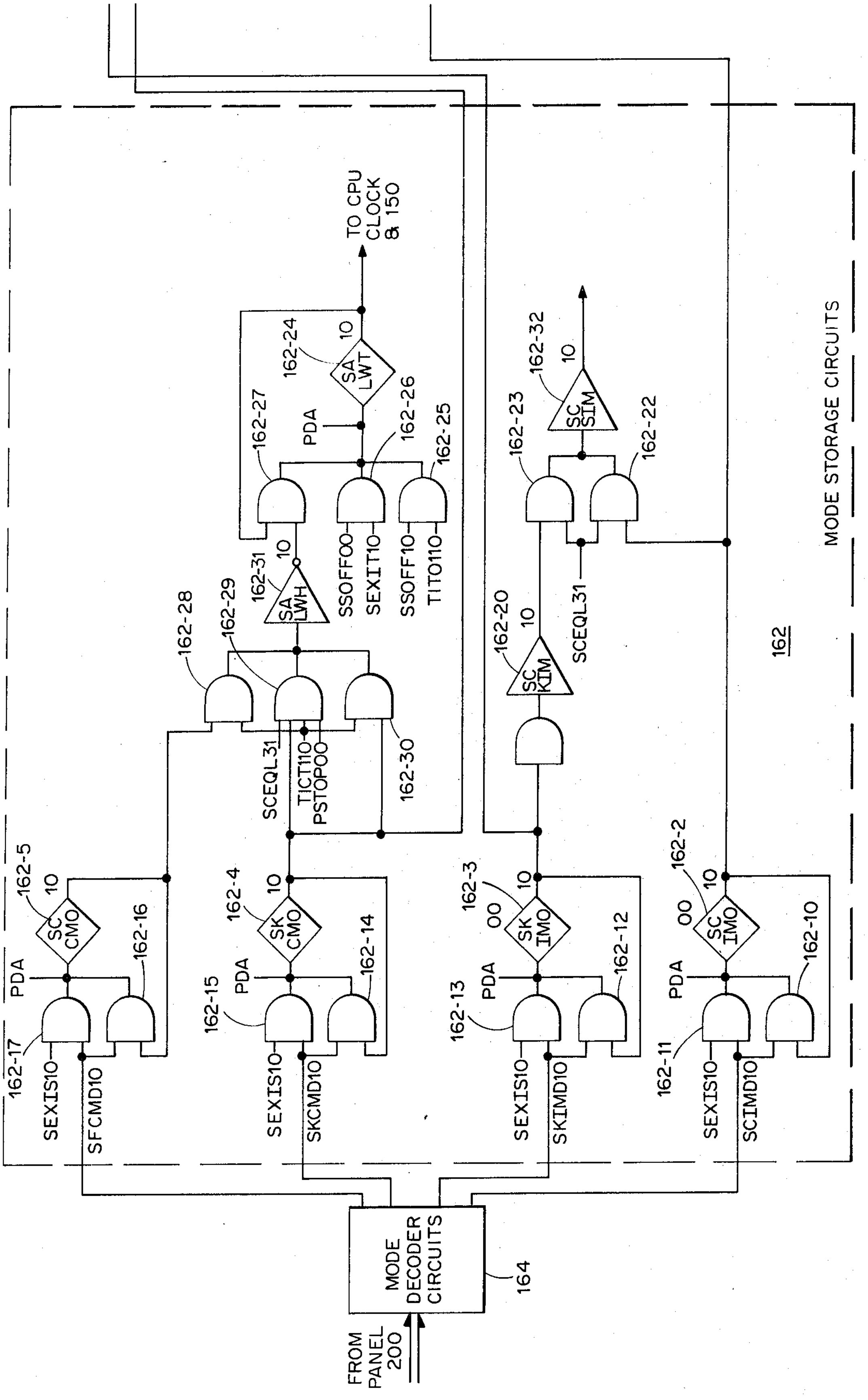
FIGS. 1*b* through 1*d* illustrate in greater detail the various blocks of FIG. 1.
Figure 1C:
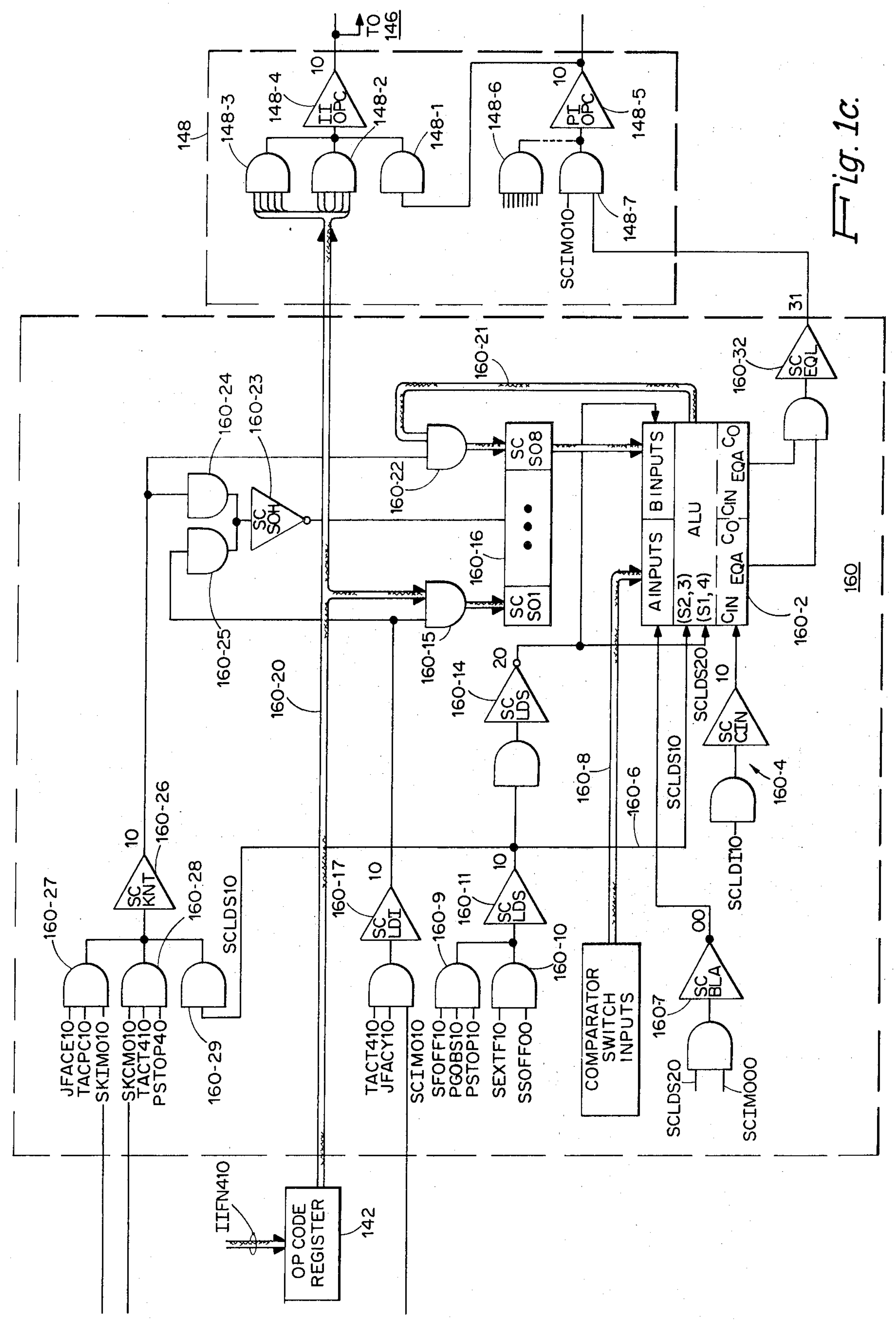
Figure 1D:
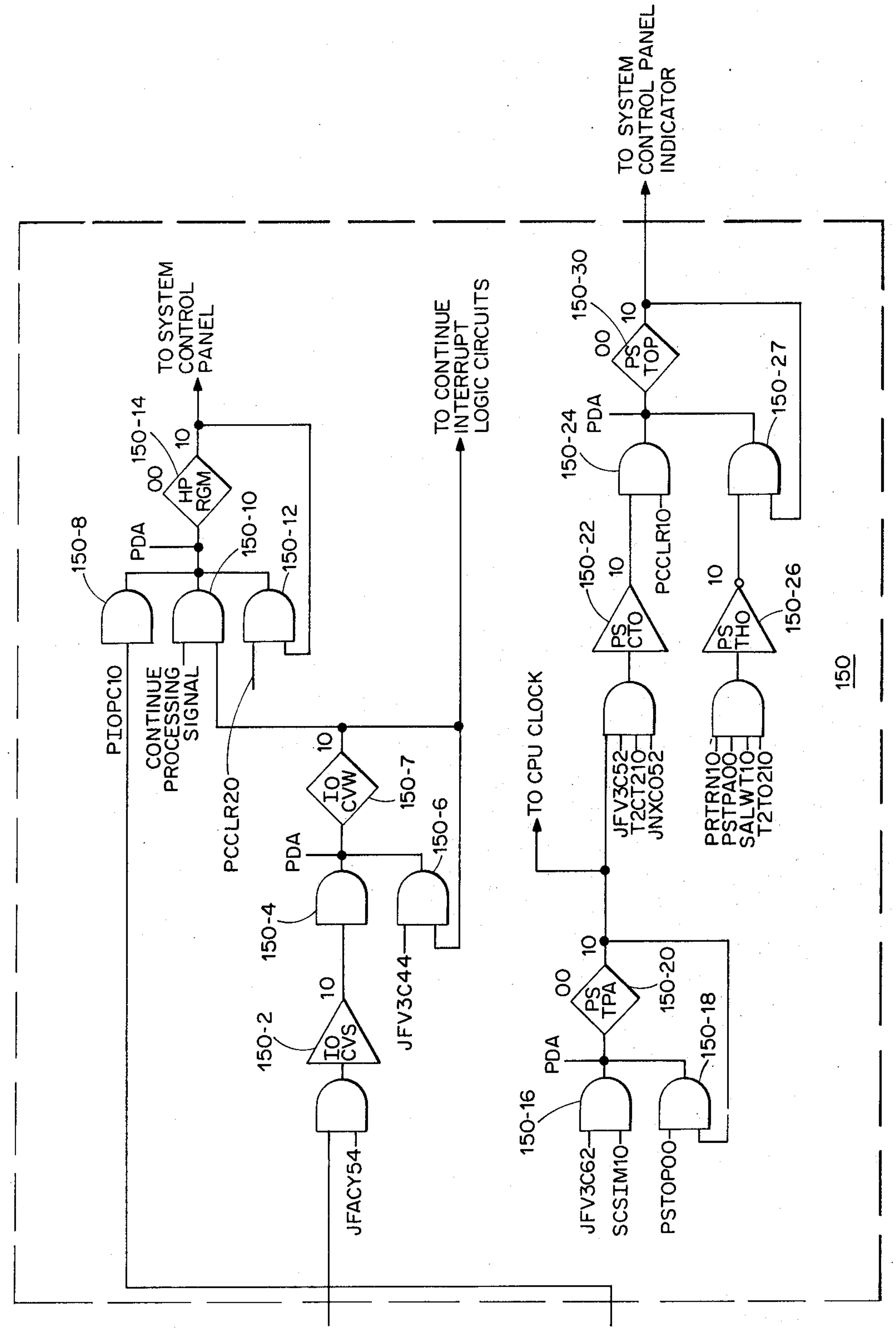

FIGS. 1b–1d show in greater detail the circuits which form a part of the mode storage circuits of block 162, the diagnostic maintenance and control circuits of block 160, the illegal op-code detector circuits of block 148, and error circuits of block 150.

2. Diagnostic-Mode and Error Control Circuits of FIG. 1*b*

It is seen from FIG. 1*b* that the mode control circuits of block 162 comprise a plurality of flip-flops 162-2 through 162-5, each of which is arranged to be set to the binary ONE state when their respective mode position has been selected by the Mode switch of the maintenance panel 200. That is, the Mode switch supplies a number of input signals to a block 162 including Mode decoder and logic circuits which decode the signals from the Mode switch and generate an appropriate input signal to an appropriate one of the flip-flops arranged to handle that switch position. When an operator presses the Execute pushbutton, this causes a signal SEXIS10 to be forced to a binary 1 , switching the flip-flop to its binary 1 state. The decoder and logic circuits of block 164 maintain the flip-flop in the binary 1 state until the operator selects or changes the Mode switch to another position. Setting and resetting of the flip-flops is accomplished by the AND gates 162-10 through 162-17 arranged as shown.

The binary 1 output terminals of the One Cycle Mode flip-flop 162-5 and Count Cycle Mode flip-flop 162-4 are connected to AND gates 162-28 through 162-31 as shown. Additionally, AND gate 162-29 receives a signal SCEQL310 from the diagnostic and maintenance circuits 160, a signal PSTOPOO from block 150 and a timing signal T1CT110 from the CPU main clock circuits, not shown. When any one of the AND gates 162-28 through 162-31 are rendered active, it forces the output of an inverter amplifier circuit 162-31 to a binary 0 which in turn resets an Allow CP times flip-flop 162-24 to its binary ONE state. The binary 1 output of this flip-flop is applied to the CPU clock circuits and defines the time intervals during which the CPU is enabled for processing instructions. The Allow CP times flip-flop 162-24 is switched to its binary ONE state when the Mode switch is other than in the OFF position (signal SSOFF00 is a binary 1) and the Execute pushbutton is depressed (signal SEXIT10 is a binary 1). Switching occurs via AND gate 162-26 in response to a clocking pulse PDA being applied to the flip-flop. In a similar fashion, the AND gate 162-25 switches flip-flop 162-24 to its binary 1 state when the Mode switch has been placed in its OFF position (i.e., signal SSOFF10 is a bınary 1) and the CPU clock applies a timing signal T1T0110.

The binary 1 output of the Count Instruction Mode flip-flop 162-3 is applied via an AND gate and amplifier 162-22 and AND gate 162-23. When the signal SCEQL30 is applied by the circuits of block 160, AND gate 162-23 applies a stop signal SCSIM10 to the CPU error and control circuits of block 150.

3. Diagnostic/Maintenance Circuits 160 of FIG. 1*c*

The block 160 as shown includes as major elements, the storage register 160-16 and an arithmetic and logic circuit (ALU) 160-2. This circuit is connected to operate as a comparator and can also be equivalent in structure to the ALU of FIG. 1. When operating in a Count Instruction Mode, the ALU circuit 160-2 generates signal SCEQL30 mentioned above when the count initially established by the comparator switches of the panel 200 and loaded into storage register 160-16 has been decremented to zero (i.e., both sets of signals applied to the ALU circuit 160-2 are the same). When in the Count Instruction Mode, each time an instruction is executed, an AND gate 160-27 is operative to apply a decrement signal to the storage register 160-16 via an AND gate 160-22. Thus, the AND gate 160-27 establishes the point at which the CPU will be considered to have executed an instruction. Specifically, AND gate 160-27 is rendered active when a signal JFACE10 is a binary 1 indicating that the CPU has performed an A cycle of operation where it fetches an operand address of an instruction from main memory 104, a signal TACPC10 is a binary 1 indicating that the cycle is required for processing a CPU instruction and a signal SKIM010 is a binary 1 signalling that the CPU is operating in the Count Instruction Mode.

Similar to the above, an AND gate 160-28 is operative to apply decrementing signals to the storage register 160-16 when the CPU has been placed in a Count Cycle Mode of operation (i.e., signal SKCM010 is a binary 1), the CPU clock generates a timing signal CACT410 condition the CPU has not been placed in the stop codiion (i.e., signal PSTOP40 is a binary 1).

To provide the mode of operation of the present invention, apparatus is added to share the circuits of block 160 used in connection with the other test modes previously described. For example, it can be seen from FIG. 1*b* that the binary 1 output of the Compare Instruction Mode flip-flop 162-2 is applied to an AND gate 162-22 which couples to the amplifier 162-32. Thus, when signal SCEQL31 is forced to a binary 1 and the system is being operated in the Compare Instruction Mode (i.e., signal SCIM010 is a binary 1), the amplifier 162-32 provides stop signal SCSIM10 which in turn is applied to the control circuits 150. Also, a further gate 160-29 is connected to receive the load storage register signal SCLDS10 which is used to reset the storage register 160-16 to an all ZERO state via the gate 160-24 and the inverter circuit 160-23 when circuits 160 are used for other modes of operation. The load signal SCLDS10 generated by the signals applied to either an AND gate 160-9 or an AND gate 160-10 is normally a binary 0 when the circuits 160 are operating in the Compare Instruction Mode.

As seen from FIG. 1*c*, the Compare Instruction Mode signal SCIM000 when a binary 0 causes an AND gate and inverter circuit 160-7 to force a signal SCBLA00 to a binary 1 which enables the output signals produced by the comparator switches to be applied to the ALU circuit 160-2 via the A input terminals. Additionally, a signal SCLDS20 generated by a gate and inverter circuit 160-14 allows the application of output signals from the storage register 160-16 to the ALU circuit 160-2 via the B input terminals.

It will be further noted that the output terminal of Compare Instruction Mode flip-flop 162-2 is applied to a further AND gate and amplifier circuit 160-17 which forces a signal SCLDI10 to a binary 1 during an A cycle of operation (i.e., signal JFACY10 is a binary 1) in response to a trailing edge of a timing signal CT410 from the CPU clock circuits. Prior to loading a binary representation of the contents of the op-code register in storage register 160-16, the signal SCLDI10 first conditions the gate 160-25 to reset or clear the storage register 160-16 to all zeros. The binary contents of the op-code register 142 are then loaded via gate 160-15 into the storage register 160-16 in response to signal SCLDI10 at the termination of timing signal CT410. When signal SCLDI10 switches to a binary 0, it causes the gate 160-25 and inverter circuit 160-23 to maintain hold signal SCSOH10 at a binary 1. Thus, the op-code contents of the register 142 are held in storage register 160-6 until signal SCLDI10 is again forced to a binary 1.

Additionally, the signal SCLDI10 is applied by an AND gate and amplifier circuit 160-4 to a carry-in input terminal of the ALU circuit 160-2. The load signal SCLDS10 and its complement SCLDS20 are applied to a plurality of mode input terminals and condition the ALU circuit 160-2 to operate in a subtract mode. This enables the ALU circuit 160-2 to perform the desired comparison operation upon the two sets of signals applied to the A and B input terminals. Since none of the gates 100-27 through 100-29 are enabled during the Compare Instruction Mode, signal SCKNT10 is a binary 0 which inhibits a set of AND gates 160-22 from applying the output signals from the ALU circuit 160-2 on a set of conductors 160-21 to the storage register 160-16.

Normally, the signals stored in the op-code register 142 are applied via another set of conductors 160-20 to the illegal op-code detector circuits 148. The illegal op-code detector circuits 148 normally receive other sets of input signals via additional AND gating circuits as illustrated by an AND gate 148-3 and an AND gate 148-6 which couples to an amplifier circuit 148-5. These circuits 148 operate to detect the bit pattern of an illegal op-code which results in an amplifier 148-4 forcing an illegal op-code signal II0PC10 to a binary 1 state. This signal is in turn applied to the CPU error and control circuit 150 as shown in FIG. 1*d.*

In accordance with the invention, the op-code detector circuits 148 receive the signal SCEQL31 from the ALU circuit 160-2 via a further gate 148-1. When the circuits of block 160 are being operated in the Compare Instruction Mode, this signal is generated via an AND gate and amplifier circuit 160-32 when the ALU circuit 160-2 senses that the op-code stored in the storage register 160-16 compares identically with the op-code bit pattern designated by the comparator switch input signals. Specifically, an all zero result produced by the ALU circuit 160-2 forces the EQA and EQB output terminals of the circuit 160-2 to binary 1 states. These two signals condition the circuit 160-32 to switch an AND gate 148-7 to a binary 1 when the system is being operated in the Compare Instruction Mode (i.e., signal SCIM010 is a binary 1). The AND gate 148-7 in turn causes amplifier circuit 148-5 to switch signal PIOPC10 to a binary 1.

4. CPU Error Control Circuits 150 of FIG. 1*d*

The circuits of this block include an Op Code Violation Stored flip-flop 150-7, a Program Error Indicator for Halt flip-flop 150-14, a Program Stop Allow flip-flop 150-20 and a Program Stop flip-flop 150-30 arranged as shown and normally included within the CPU.

During normal operation when the error signal II0PC10 is a binary 1 and the system is operating in an A cycle of operation (signal JFACY54 is a binary 1), an AND gate and amplifier circuit 150-2 is operative to switch the Op Code Violation Stored flip-flop 150-7 to its binary 1 state via a gate 150-4. The flip-flop 150-7 is reset to its binary 0 state when the CPU switches to an initial or extraction cycle (i.e., signal JFV3C44 is a binary 0). The binary ONE output of flip-flop 150-7 is applied to an AND gate 150-10 of the Program Error Indicator flip-flop 150-14. Additonally, the AND gate 150-10 receives a continue processing signal which enables the CPU to interrupt its processing in response to an error condition to determine whether processing is to be continued. This gate is activated in accordance with normal CPU error processing.

Additionally, in accordance with the present invention, the signal PIOPC10 from amplifier circuit 148-5 is applied to flip-flop 150-14 via a gate 150-8, as shown. The flip-flop 150-41 is reset to its binary 0 state via an AND gate 150-12 in response to a clear signal PCCLR20.

The two flip-flops 150-20 and 150-30 connect in series via an AND gate and amplifier circuit 150-22 and AND gate 150-24. These two circuits are operative to generate a STOP signal for stopping CPU operation in response to the signal SCSIM10 when the CPU is operating in other than in an initial or extraction cycle wherein it would be operative to extract or fetch the next instruction from main memory 104. A signal JFV3C62 defines this cycle of operation and together with signal SCSIM10 conditions AND gate 150-16 to switch flip-flop 150-20 to its binary 1 state. The flip-flop 150-20 is returned to its binary 0 state by an AND gate 150-18 when flip-flop 150-30 switches to its binary 1 state. The flip-flop 150-20 switches Program Stop flip-flop 150-30 to its binary ONE state when the CPU has been returned to an initial or an extraction cycle (signal JFV3C52 is a binary 1) in response to a clear signal PCCLR10 being forced to a binary 1 in the presence of a timing signal T2CT210 being generated by the CPU clock circuits and in the absence of an I/O operation taking place (i.e., signal JNXC052 is a binary 1). This, in turn, causes signal PSCT010 to switch an AND gate circuit 150-24 to switch flip-flop 150-3 to its binary 1 state. The flip-flop is reset via an AND gate and inverter circuit 150-26 in response to a timing signal T2T0210 being generated by the CPU clock circuits.

5. Description of Operation of Preferred Embodiment

With reference to FIGS. 1, 1*a* through 13, 2*a* and 2*b*, the operation of the preferred embodiment will be described. For the purposes of the present invention, it is assumed that the CPU of FIG. 1 can process instructions in any one of a number of different character modes and has an instruction set such as that described in the manual titled "Series 200 Hardware – Programmers' Reference Manual (Models 200–4200)," published by Honeywell Information Systems Inc., Copyright 1971, Order No. Ba 85, Rev. 0. Also, the CPU of FIG. 1 can be considered to operate in the manner similar to that disclosed in U.S. Pat. No. 3,331,056 titled "Variable Width Addressing Arrangement," invented by Walter R. Lethin et al. which issued July 11, 1967 and is assigned to the assignee named herein.

In the example given herein, it is assumed that the CPU of FIG. 1 has a malfunction which intermittently occurs when the CPU is executing a multiply instruction. The field service representative using the arrangement of the present invention is able to locate immediately this type of instruction and start analyzing CPU operation during its execution of this type of instruction to determine at which point the system does not operate properly. In order to set up the desired conditions, the field service representative places the Mode switch on the maintenance panel 200 to the Instruction Type position. Following that, the service representative sets up the op-code pattern corresponding to a multiply instruction using the comparator switches 1 through 8 on the maintenance panel 200 of FIG. 1*a*. The other control switches, of course, are set to the OFF position. The field service representative, after performing these other operations presses the Execute pushbutton to establish a new mode, here the Compare Instruction Mode. When the field service representative depresses a Start button on the control panel, the CPU of FIG. 1 is operative to sequence through its program instructions at normal processing speeds until it encounters a multiply instruction, at which time it will come to an orderly halt and signal a program error. The field service engineer at that time can clear the error condition by placing maintenance panel Mode switch to either the One Cycle or the Cycle Count Mode position or by changing the setting of the comparator switches. The engineer then can proceed to check the operation of the system of FIG. 1 manually in a conventional manner by stepping the system either a cycle at a time or a number of cycles at a time as specified by the settings of comparator switches.

The above operations will now be described in greater detail with specific reference to the instruction flow diagram of FIGS. 2*a* and 2*b*. It is assumed that the first instruction fetched and executed is other than a multiply instruction. During the normal operation, the CPU is operative to initiate an extraction cycle V3, during which the CPU executes the operations indicated in block 200. For example, the CPU reads out the contents of the sequence counter storage location from control memory 112 and uses them to address four main memory locations storing four consecutive characters which are read into input/output register 106. Assuming that the system has been conditioned to operate in a four character mode of operation, the characters are read out into the MLR register 106 includes the op-code and three A address characters. The op-code character from the N4 section of register 106 is stored in the op-code register 142 during the V3 cycle. Additonally, the sequence counter contents are incremented by one and restored to control memory 112. Also, a working location is addressed (i.e., working location 3) and the original contents of the sequence counter location are stored therein.

The CPU of FIG. 1 is operative to sample the various settings of the Mode decoder circuits to determine if the CPU can proceed to the next cycle at normal speeds or manually in response to signals generated from the maintenance panel. These operations are illustrated by blocks 202 through 204 of FIG. 2*a*. Since the maintenance panel Mode switch has been placed in the Instruction Type position and the remaining switches are set to the OFF position, the processing of instructions proceeds at normal operating speeds. Thus, the CPU of FIG. 1 sequences to an A cycle of operation during which it is operative to fetch the A operand address characters from main memory 104 as illustrated by block 206. Specifically, since the sequence counter will have been incremented by one during the proceeding V3 cycle, during the A cycle of operation, it is operative to address main memory and read out into register 106 four characters which constitute the complete address of the A operand (A address). During this cycle, the CPU transfers the four A address characters to storage circuits included in the ALU 120 whereafter it is written into the A address counter storage location of control memory 112 during the next cycle of operation. The contents of the sequence counter location are incremented by five and then restored to control memory 112. During the A cycle, the diagnostic/maintenance circuits 160 are operative to clear storage register 160-16 to all zeros and then load the register with op-code contents of register 142. The ALU circuit 160-2 then compares the 2 bit patterns. Since the first instruction is not a multiply instruction, signal SCEQL31 remains a binary 0.

Following the A cycle of operation and the testing of the Mode switch signals, the CPU is operative to determine whether the CPU error detection circuits 150 have detected any errors. Assuming that there have not been any errors, the CPU enters a cycle of operation wherein it is operative to fetch the address characters of a second operand (B address) from main memory 104. The CPU, as indicated by block 214, is operative during the B cycle to read out into register 106 all four characters which comprise the B operand address. These characters are then stored in the ALU and then transferred to the B address counter storage location of control memory 112 during the next cycle. Also, during the B cycle, the sequence counter contents are incremented by the proper amount and the complete A operand address is stored in control memory.

It is assumed that the instruction here being processed has a format F/A/B which means that during the next cycle of operation (V1 cycle), the op-code character of the next instruction will have been read out into register 106 and this character will contain "a word mark" signalling that the complete first instruction has been fetched or extracted. The CPU, as also illustrated by block 220 of FIG. 2, does not increment the contents of the sequence counter location so that it points to or designates the storage location storing the op-code of the next program instruction to be processed. Also, during the V1 cycle, the complete B address is transferred from the ALU into the B address counter location of control memory 116.

Following the V1 cycle of operation, the CPU then enters one or more execution cycles (E cycles) wherein it performs the operation specified by the op-code upon the two operands located at the addresses specified by the A and B operand addresses. At the completion of execution, the CPU then returns to a V3 cycle of operation wherein it begins fetching the next instruction. It is assumed that this instruction is a multiply instruction.

During the V3 cycle of the multiply instruction, the CPU is operative to load the op-code character into the op-code register 142 in response to subcommand signal IIFN410. Since the CPU has been placed in the Compare Instruction Mode, the bit pattern of op-code character stored in the op-code register 142 is loaded into storage register 160-16 during the A cycle of operation in response to signal SCLDI10. At the same time, the illegal op-code detector circuits 148 sample the contents of the op-code register and since the op-code is normally regarded as legal, signal IIOPC10 remains a binary 0.

The signal SCBLA00 causes comparator switch output signals to be applied to the ALU circuit 160-2 via its A input terminals and bus 160-8. At the same time, signal SCLDS20 allows the op-code contents of the storage register 160-16 to be applied to the ALU circuit 160-2 via its B input terminals.

Since, in this example, the op-code of the instruction being processed by the CPU specifies a multiply operation and the comparator switches have been set to specify a multiply type instruction, the ALU circuit 160-2 is operative to force outputs EQA and EQB to binary 1. This, in turn, conditions AND gate 160-32 to force equal signal SCEQL31 to a binary 1. The AND gate 148-4 is operative to force signal PIOPC10 to a binary 1 which in turn generates an illegal op-code signal IIOPC10. At the same time, the equal signal SCEQL31 causes AND gate 162-22 to force stop instruction mode signal SCSIM10 to a binary 1. The signal IIOPC10 causes the CPU to come to an orderly halt by forcing it to enter an M3 cycle of operation and perform the operations indicated in block 230. Specifically, the illegal op-code signal IIOPC10 causes the program error indicator flip-flop 150-14 to be switched to a binary 1 via gate 150-8. Also, the CPU causes the original contents of the sequence counter location contained in WL3 to be restored and the cycle counter control circuits to be placed in a V3 cycle of operation.

Stop instruction mode signal SCSIM10 is operative to switch the Stop Allow flip-flop 150-20 to a binary 1 which inhibits the CPU clock circuits from generating further clocking signals, such as signals T2CT210. This, in effect, places the CPU in an abnormal condition.

As indicated by blocks 232 through 240, the CPU must be first returned to a normal stop. This occurs when the field service representative changes either the Mode switch to another position or changes the setting of the comparator switches, depresses the Execute pushbutton, and then depresses the Clear button on the system control panel. At this time, signal PCCLR10 is forced to a binary 1 and the flip-flop 150-20 conditions the Stop flip-flop 150-30 to switch to a binary 1 state when the CPU clock circuits generate signal T2CT210. The signal PSTO00 causes flip-flop 150-20 to reset to a binary 0 which is subsequently followed by the resetting of flip-flop 150-30 to a binary 0.

Figure 2A:
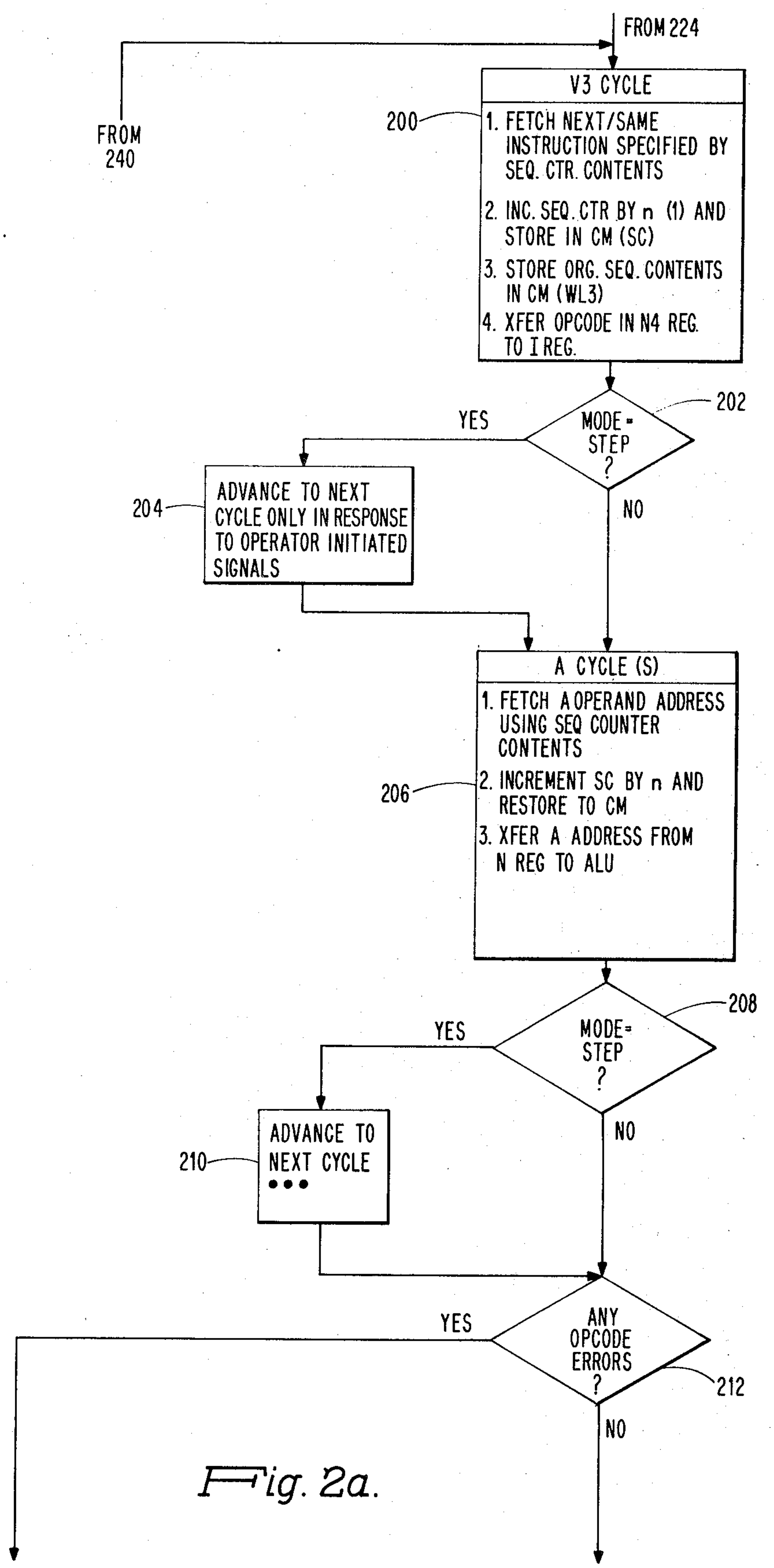
FIGS. 2*a* and 2*b* illustrate a simplified instruction flow diagram used in explaining the operation of the present invention.
Figure 2B:
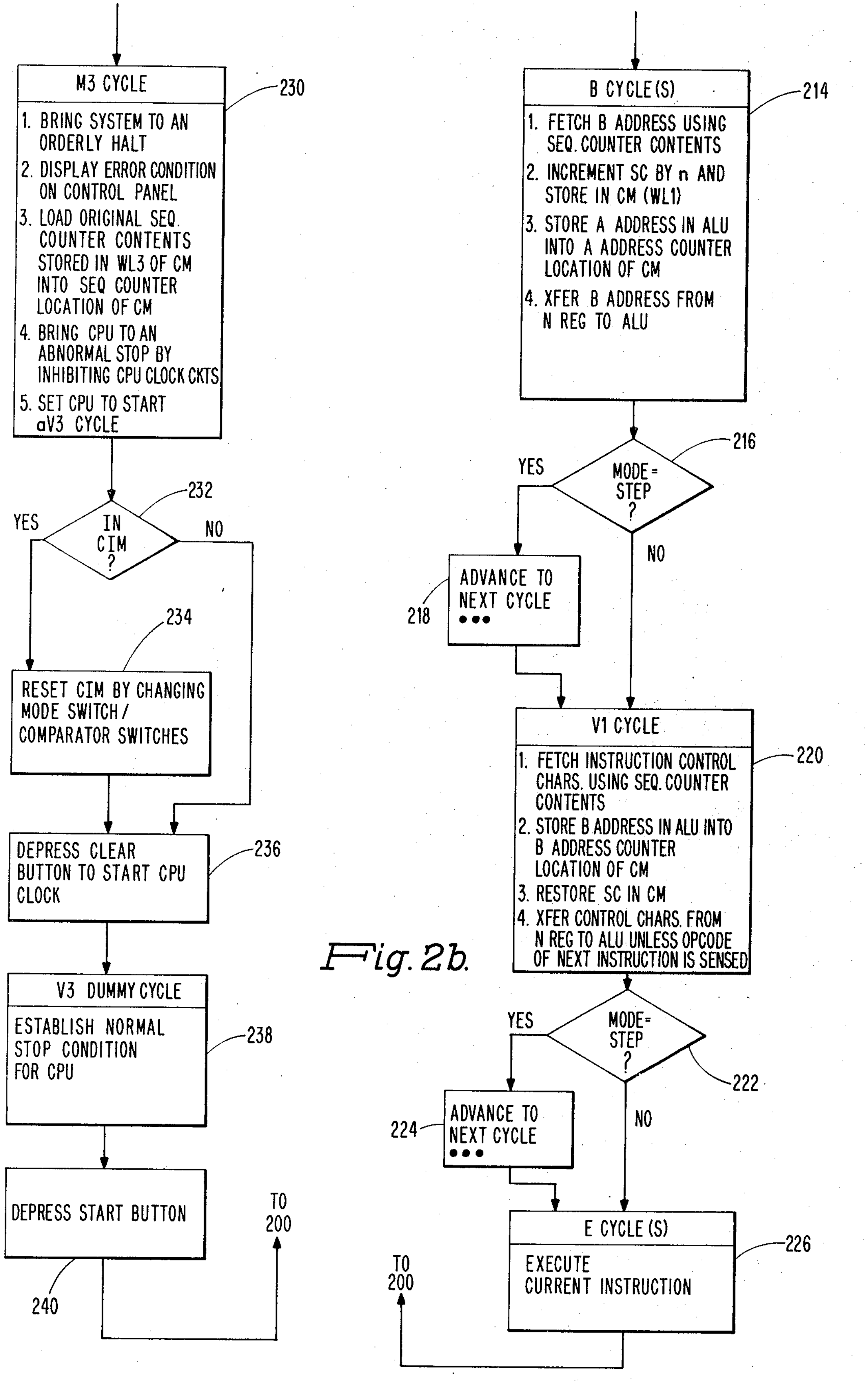

From FIG. 2*a*, it is seen that after the M3 cycle, the sequence counter storage location contents are at an address which corresponds to the address of the beginning of the instruction. With the system placed in the stop condition, it remains there until the field service representative depresses the Execute button. Thereafter, in accordance with the setting of the Mode switch, the ALU circuit 160-2 and associated circuits are operative to condition the CPU to operate in either a One Cycle Mode or Count Cycle Mode as the field service representative selects. Since the mode control circuits do not define the Compare Instruction Mode, signal SCLDI10 is maintained at a binary 0 which prevents the contents of the op-code register 142 from being loaded into the storage register 160-16. The operations now performed under the control of the maintenance panel 200 proceed in a conventional manner.

It is seen from the foregoing that with the addition of a minimal amount of logic circuits, a data processing system can be sequenced through a number of instructions and made to stop operations when it encounters a particular type of instruction defined by an operator. The arrangement minimizes the amount of logic circuits by having the particular instruction type defined for the purposes of a test operation as an illegal op-code. In this manner, the CPU can have its operation stopped so that when operation is again initiated, the CPU can start at the same instruction previously defined as illegal.

It can be seen from the foregoing that the arrangement of the invention can be particularly helpful where the instruction which was believed to provide the malfunction occurs once in a program loop. That is, using the apparatus of the present invention, the field service representative can stop CPU operation upon an occurrence of a particular type of instruction so that test operations can be initiated when this instruction is encountered.

It will be appreciated that the arrangement of the present invention can be used in conjunction with other systems where it is desirable to provide means for allowing the system to stop on a specific type of instruction afforded with the addition of a minimum number of circuits.

While in accordance with the provisions and statutes, there has been illustrated and described the best form of the invention known, certain changes may be made in the technique and system described without departing from the spirit of the invention as set forth in the appended claims and that in some cases certain features of the invention may be used to advantage without a corresponding use of other features.

Having described in the invention, what is claimed as new and novel is:

1. Diagnostic apparatus for locating any one of a plurality of program instructions of a program stored within an addressable memory of a data processing system which includes control cycle means for generating control signals required for processing said instructions, said diagnostic apparatus comprising:

means for receiving a first set of binary coded signals corresponding to a predetermined portion of each instruction read out from said memory during the processing of said instruction, said predetermined portion defining a type of operation to be performed by said system;

switching means for generating a second set of binary coded signals identifying a type of instruction to be located; and, comparison means coupled to said control cycle means and including first and second sets of input terminals and an output terminal, said first set of input terminals being coupled to receive said first set of binary coded signals and said second set of input terminals being coupled to receive said second set of binary coded signals and said output terminal being coupled to said control cycle means, said comparison means being conditioned by said control means to compare said codes during the processing of said instruction and said comparison means further including means operative to generate a control signal at said output terminal upon sensing a true comparison between said codes, said control cycle means being conditioned by said control signal to bring said system to an orderly halt.

2. The apparatus of claim 1 wherein said means for receiving includes storage register means coupled to said memory for storing a command code of each said instruction and wherein said control cycle means includes detector circuit means coupled to said storage register means and to said output terminal, said detector means being operative upon sensing when an instruction includes an illegal command code to condition said control cycle means to complete the processing of an instruction by bringing said system to an orderly halt, said comparison means being operative to condition detector circuit means upon sensing said true comparison to operate as having sensed an illegal command code.

3. The system of claim 1 wherein said switching means includes a plurality of manually controlled switch circuit means for generating said second set of binary coded signals.

4. A data processing system including; a main memory for storing program instructions and data, storage register means coupled to said memory for storing a first binary code corresponding to a predetermined portion of a program instruction to be executed by said system, detector circuit means coupled to said register means for signalling when said binary code specifies a nonexecutable instruction, control circuit means coupled to said storage register mean and to said detector circuit means, said control means being conditioned by said code to generate a plurality of subcommand signals for directing said system in executing those operations specified by said program instruction, mode control means coupled to said control circuit means, said mode control means being operative to establish a number of different test modes for said system; and, said system further including diagnostic apparatus comprising:

storage register coupled to said storage register means and to said mode control means;

input switching means for generating signals representative of a second binary code; and, comparison circuit means coupled to said storage register means to said mode control means and to said input switching means, said comparison means being conditioned by said mode control means to generate an output signal upon sensing a true comparison between said first and second binary codes, said detector circuit means being operative in response to said output signal to condition said control means to bring said system to an orderly halt when said mode control means has conditioned said system to operate in a predetermined one of said modes.

5. The system of claim 4 wherein said input switching means includes a plurality of manually controlled switch circuit means for generating signals corresponding to said second binary code.

6. The system of claim 4 wherein said mode control means includes:

a plurality of bistable storage means, each individually coupled to said diagnostic apparatus and decoder means individually coupled to each of said plurality of bistable storage means, said decoder means being operative to apply a predetermined set of signals for switching a predetermined one of said plurality of bistable storage means from a first state to a second state, establishing said predetermined one of said number of test modes for said system.

7. The system of claim 6 wherein said system is conditioned by said mode control means to process program instructions at normal operating speeds when system is operating in said predetermined one of said operating modes.

8. The system of claim 4 wherein said comparison means includes:

arithmetic and logic circuit means, said arithmetic and logic circuit means having first and second sets of input terminals and an output terminal, said first set of input terminals being coupled to receive said first binary code and said second set of input terminals being coupled to receive said second binary code and said output terminal being coupled to said detector circuit means, said arithmetic and logic circuit means being conditioned to perform a subtract operation upon said binary codes applied to said first and second input terminals and generate said output signal when said codes match.

9. The system of claim 4 wherein said system further includes error control means coupled to said detector circuit means, said error control means being conditioned by said detector circuit means to generate a signal indicating an error condition upon said system being brought to said orderly halt.

10. The system of claim 9 wherein said error control means includes first and second series connected bistable means, said first bistable means being coupled to said mode control means, said bistable means being conditioned by said mode control means to be switched from a first to a second state in response to said output signal, said first bistable means when in said second state being operative to condition said control means to bring said system to said orderly halt and place said system in an abnormal stop condition and said first bistable means conditioning said second bistable means to switch from a first to a second state in response to a clear control signal, said second bistable means when in said second stage being operative to place said system in a normal stop condition.

11. In a data processing system including; an addressable memory including a plurality of storage locations for storing program instructions and data, address register means coupled to said memory for storing an address of a storage location to be referenced, register means coupled to said memory for storing the contents of a referenced storage location, an addressable control memory including a plurality of storage locations for storing information used in processing the instructions of a program, one of said plurality of storage locations being arranged to store address information signals identifying the storage location in said memory which stores a first portion of a next instruction to be processed, op-code register means coupled to said register means for storing bit pattern corresponding to the op-code of an instruction being processed, illegal op-code detector circuit means coupled to said op-code register means for signalling the presence of an illegal bit pattern in said op-code register, control sequencing means coupled to said op-code register means and to said illegal op-code detector circuit means, said control sequencing means being operative to generate control signals for the different cycles of operation executed by said system in extraction and execution of each program instruction, and diagnostic apparatus comprising:

mode control switching means coupled to said control sequencing means and operative to establish a plurality of test modes for said system, said mode control switching means being set to establish a predetermined one of said modes;

input switching means for generating a bit pattern identifying the op-code of a predetermined type of program instruction;

comparison means coupled to said mode control switch-in means and including first and second sets of input terminals and an output terminal, said first set of input terminals being coupled to receive said bit pattern from said op-code register means, and said second set of input terminals being coupled to receive said bit pattern from said input switching means, said comparison being conditioned by said mode switching means to compare said bit patterns during a predetermined cycle of operation and said comparison means including means operative to generate a control signal at said output terminal in response to a true comparison, said illegal op-code detector means being operative in response to said control signal to treat said op-code bit pattern as illegal when said system is being operated in said predetermined mode and condition said control sequencing means to halt the processing of said instruction at a point where said one of said plurality of control memory storage locations stores address information signals which identifies the storage location in said memory which stores said op-code bit pattern.

12. The system of claim 11 wherein said input switching means includes a plurality of manually controlled switch circuit means for generating said op-code bit pattern.

13. The system of claim 11 wherein said comparison means includes:

arithmetic and logic circuit means, said arithmetic and logic circuit means having first and second sets of input terminals and an output terminal, said first set of input terminals being coupled to receive said first binary code and said second set of input terminals being coupled to receive said second binary code and said output terminal being coupled to said detector circuit means, said arithmetic and logic circuit means being conditioned to perform a subtract operation upon said binary codes applied to said first and second input terminals and generate said output signal when said codes match.

14. The system of claim 11 wherein said system further includes error control means coupled to said illegal detector circuit means, said error control means being conditioned by said detector circuit means to generate signal indicating an error condition upon said halt.

15. The system of claim 14 wherein said error control means includes first and second series connected bistable means, said first bistable means being coupled to said mode control means, said bistable means being conditioned by said mode control means to be switched from a first to a second state in response to said output signal, said first bistable means when in said second state being operative to condition said control means to bring said system to said orderly halt and place said system in an abnormal stop condition and said first bistable means conditioning said second bistable means to switch from a first to a second state in response to a clear control signal, said second bistable means when in said second state being operative to place said system in a normal stop condition.

16. Testing apparatus in combination with a data processing system for selectively locating any one of a plurality of program instructions of a program stored within an addressable memory during the processing instructions by said data processing system directed by control means included in said system, said testing apparatus comprising:

storage means coupled to receive a first set of binary coded signals corresponding to a command code of each instruction during a predetermined interval of a period of time allocated in processing said each instruction;

switching means connected to generate a second set of binary coded signals identifying a type of instruction to be located; and, comparison means, said comparison means being coupled to receive said first and second set of binary coded signals, said comparison means including means operative to generate a control signal upon said comparison means sensing a true comparison between said codes, said control means being conditioned by said control signal to bring said system to an orderly halt.

17. The apparatus of claim 16 wherein said control means includes detector circuit means for sensing an illegal command code, said detector means being coupled to receive said first set of binary coded signals and including means coupled to said comparison means, said means being operative in response to said control signal to condition said detector circuit means to operate as having sensed an illegal command code by initiating said orderly halt.

18. The apparatus of claim 16 wherein said switching means includes a plurality of manually controlled switch circuit means for generating said second set of binary coded signals.

19. The apparatus of claim 16 wherein said comparison means includes:

arithmetic and logic circuit means, said arithmetic and logic circuit means having first and second sets of input terminals and an output terminal, said first set of input terminals being coupled to receive said first binary code and said second set of input terminals being coupled to receive said second binary code and said output terminal being coupled to said detector circuit means, said arithmetic and logic circuit means being conditioned to perform a subtract operation upon said binary codes applied to said first and second input terminals and generate said output signal when said codes match.

20. The apparatus of claim 16 wherein said system further includes error control means coupled to said detector circuit means, said error control means being conditioned by said detector circuit means to general *s* signal indicating an error condition upon said system being brought to said orderly halt.

21. The apparatus of claim 20 wherein said error control means includes first and second series connected bistable means, said first bistable means being coupled to said mode control means, said bistable means being conditioned by said mode control means to be switched from a first to a second state in response to said output signal, said first bistable means when in said second state being operative to condition said control means to bring said system to said orderly halt and place said system in an abnormal stop condition and said first bistable means conditioning said second bistable means to switch from a first to a second state in response to a clear control signal, said second bistable means when in said second state being operative to place said system in a normal stop condition.

* * * * *